Nov. 19, 1929.         D. E. KEENEY         1,735,904
INSTRUMENT PANEL DESIGN

Filed June 20, 1927

Inventor
Don E. Keeney

By Blackmore, Spencer & Hulit
Attorneys

Patented Nov. 19, 1929

1,735,904

UNITED STATES PATENT OFFICE

DON E. KEENEY, OF FLINT, MICHIGAN, ASSIGNOR TO A C SPARK PLUG COMPANY, OF FLINT, MICHIGAN, A COMPANY OF MICHIGAN

INSTRUMENT PANEL DESIGN

Application filed June 20, 1927. Serial No. 200,186.

This invention relates to instrument boards of the automobile dash-board type.

It is an object of this invention to provide an instrument board of simple construction in which the instruments are mounted directly on the board, without the necessity of providing a more or less complicated instrument panel separate from the instrument board. It is a further object of this invention to provide a simplified device for so mounting the various instruments and one which has the appearance of a separate instrument panel. More specifically it is an object of my invention to provide a bezel on the face of the instrument board which aids in providing simplified means for holding the various instruments in place and has the added function of giving the illusion that the instrument board supports a separate instrument panel.

Other objects and advantages of the invention will appear in the course of the following description, taken in connection with the accompanying drawing, and will be particularly pointed out in the appended claims.

Figure 1:
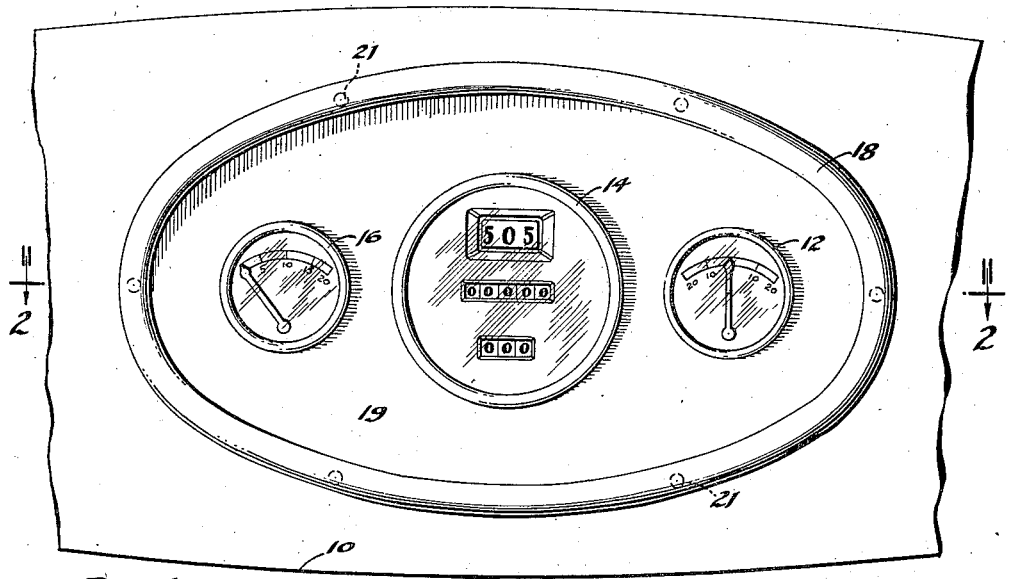
Figure 1 is a front view of my improved instrument board.

In the drawings, the numeral 10 indicates an instrument board on which are mounted the various instruments. While the number and arrangement of the instruments may be varied widely, I have shown my invention applied to an instrument board on which is mounted an ammeter 12, speedometer 14 and oil gauge 16.

Figure 2:
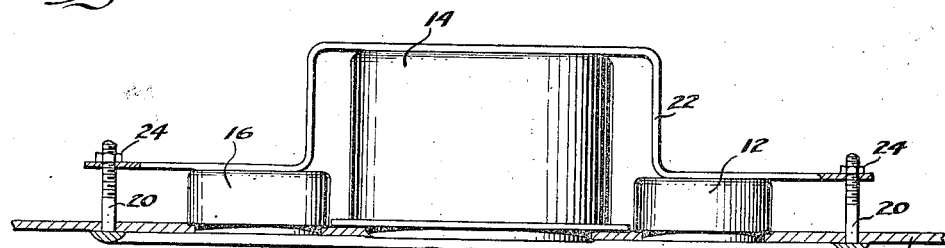
Figure 2 is a section on the line 2—2 of Figure 1.

I have shown two modifications of the means for mounting the instruments. In Figure 2 I have shown the instruments mounted from the rear or under side, each fitting snugly in its respective aperture. On the face of the dash-board and surrounding the dials is the metal beading or bezel 18. This may be of any desired shape, preferably of course symmetrical. At spaced intervals about the bezel 18 are arranged threaded studs 20. Fitting over the instruments is a clamp or clamping strap 22, through which the studs 20 extend, corresponding apertures being provided in the instrument board. Nuts 24 serve to fix the bezel 18 and clamp 22 in place on the instrument board as illustrated. Only two studs 20 of the length illustrated are necessary tho more may be used. Additional threaded studs, only long enough to extend through the instrument board, may be provided, as indicated by the dotted lines at 21 in Figure 1, for cooperation with suitable nuts for holding the bezel in place.

Figure 3:
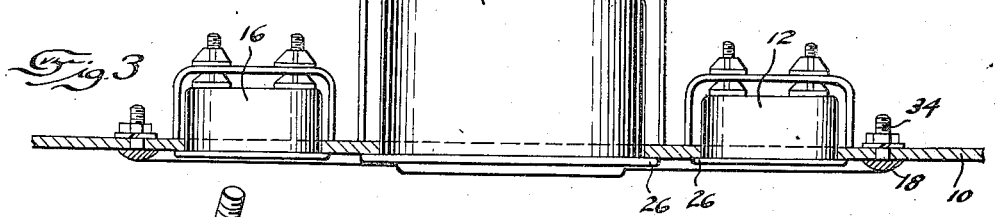
Figure 3 is a section similar to Figure 2 but showing a modified device for holding the instruments in place.

In Figure 3 I have illustrated instruments which are fitted into their respective apertures from the front, being held against displacement rearward by means of flanges 26. The rear face of each instrument is provided with one or more threaded studs 28, over which an apertured bracing strap or clamp 30 is placed and held thereon by one or more nuts 32. In this modification the studs 34 on the bezel are only long enough to extend well through the panel as illustrated.

Figure 4:
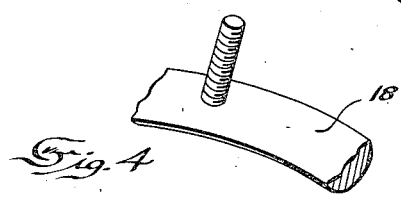
Figures 4, 5 and 6 show modifications of the arrangement for fixing the bezel to the dash-board.
Figure 5:
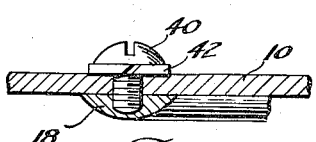
Figure 6:
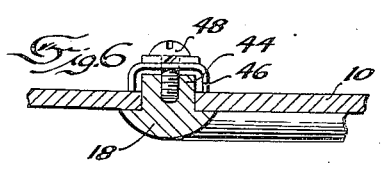

In Figure 4 I have shown the threaded stud as integral with the bezel and adapted to carry the threaded fastening nut. In Figure 5 I have illustrated a modification in which a threaded screw 40 with a washer 42 is used for cooperating with a threaded opening in the bezel for holding the bezel in place. In Figure 6 I have illustrated the bezel as provided with a thickening lug 44 extending through an aperture in the dash-board. Over this lug is placed a clamp 46. The structure is fixed in place by the screw 48. Any of the fastening devices illustrated or drive screws or self-tapping screws may be spaced at desired intervals about the bezel.

If desired, the space 19 of the dash-board within the bezel may be given a finish different from the rest of the dash-board, so that the resemblance to a separate instrument panel may be more marked.

I claim:

1. The combination of an instrument board, a plurality of instruments at the rear of the instrument board, a bezel disposed at the front of the board surrounding the instruments and defining an instrument panel, and common clamping means for securing the instruments and the bezel to the panel.

2. In the combination as defined in claim 1, said last named means comprising studs carried by the bezel and projecting rearwardly through the panel, a clamping member engaging the rear face of the instruments, and means for adjustably securing the clamping member to said studs.

In testimony whereof I affix my signature.

DON E. KEENEY.